United States Patent [19]

Nishibe et al.

[11] Patent Number: 4,969,113
[45] Date of Patent: Nov. 6, 1990

[54] METHOD AND APPARATUS FOR MEASURING SENSOR OUTPUT

[75] Inventors: Takashi Nishibe; Shotaro Yokoyama, both of Kanagawa, Japan

[73] Assignee: Fuji Electric Co., Ltd., Kanagawa, Japan

[21] Appl. No.: 281,740

[22] Filed: Dec. 9, 1988

[30] Foreign Application Priority Data

Jan. 27, 1988 [JP] Japan .................................. 63-16248

[51] Int. Cl.⁵ .............................................. G04F 8/00
[52] U.S. Cl. ................................... 364/569; 364/556; 356/222
[58] Field of Search ............... 364/556, 555, 569, 525, 364/550; 377/53, 20, 39; 356/213, 218, 222; 250/201 PF, 201 R

[56] References Cited

U.S. PATENT DOCUMENTS

| | | | |
|---|---|---|---|
| 4,306,807 | 12/1981 | Sakane et al. | 356/218 |
| 4,309,604 | 1/1982 | Yoshikawa et al. | 356/222 |
| 4,465,369 | 8/1984 | Saegusa et al. | 356/222 |
| 4,485,442 | 11/1984 | Snaper et al. | 377/20 |
| 4,513,430 | 4/1985 | Vora et al. | 377/24 |
| 4,517,684 | 5/1985 | Fennel | 377/39 |
| 4,795,984 | 1/1989 | Janssen | 377/39 |
| 4,802,194 | 1/1989 | Nishibe | 377/20 |
| 4,815,113 | 3/1989 | Ludwig et al. | 377/39 |

FOREIGN PATENT DOCUMENTS

0054822 4/1982 Japan .................................. 356/213
62-204184 9/1987 Japan .

Primary Examiner—Parshotam S. Lall
Assistant Examiner—Michael Zanelli
Attorney, Agent, or Firm—Finnegan, Henderson, Farabow, Garrett, and Dunner

[57] ABSTRACT

A method and apparatus for measuring the output of the measurement signal output by an optical sensor, for determining the intensity of the lights incident on the sensors. A plurality of setting values corresponding in a functional relationship to a plurality of estimated light intensity values being stored, prior to the measurement, in a memory. An address specifying means for causing the memory to output one of the plurality of setting values prestored therein during the time the address is specified. A count means for counting clock pulses with a predetermined period during the time duration of the measurement signal. A detecting means for detecting a comparison between the count value of the clock pulses and the setting value prestored in the memory and then causing the address specifying means to specify a new address in the memory in response to the detection result.

11 Claims, 3 Drawing Sheets

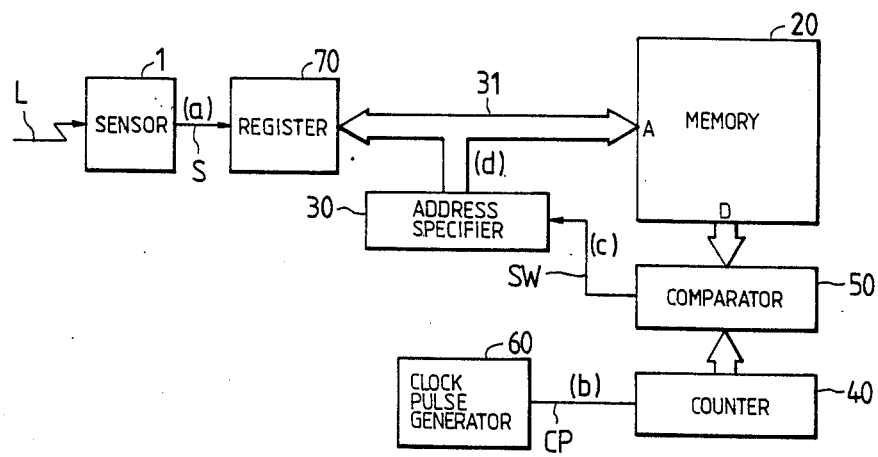
FIG. 1
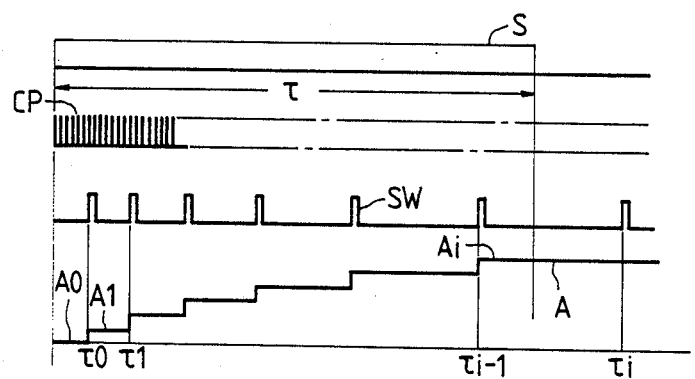
FIG. 2(a)
FIG. 2(b)
FIG. 2(c)
FIG. 2(d)
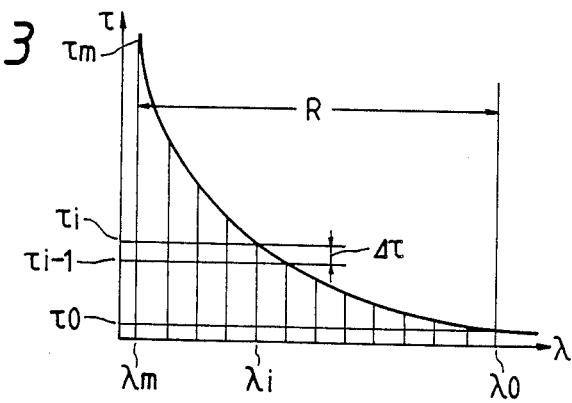
FIG. 3

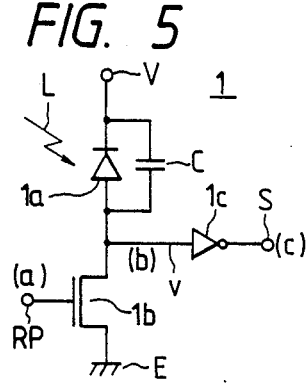
FIG. 5
FIG. 6(a)
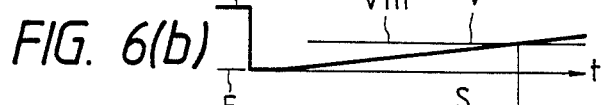
FIG. 6(b)
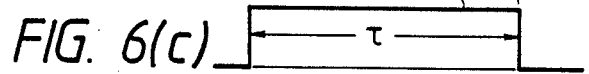
FIG. 6(c)
FIG. 7 PRIOR ART
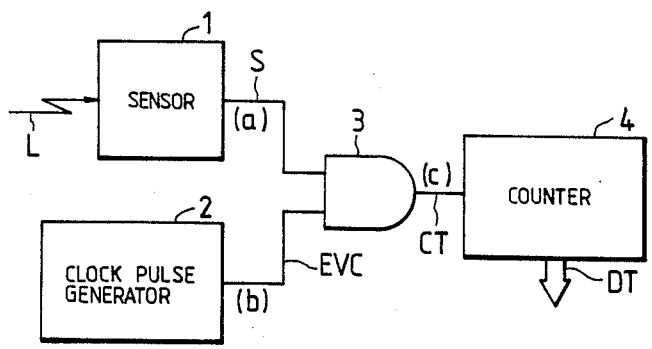
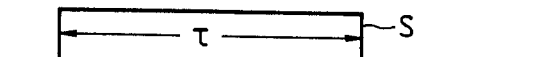
FIG. 8(a)
PRIOR ART
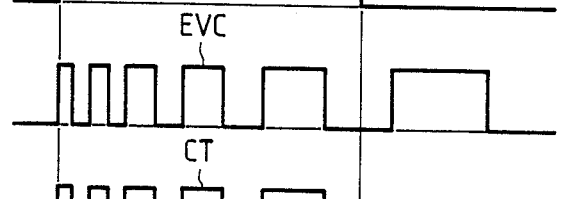
FIG. 8(b)
PRIOR ART
FIG. 8(c)
PRIOR ART

METHOD AND APPARATUS FOR MEASURING SENSOR OUTPUT

BACKGROUND OF THE INVENTION

1. Field of the Invention

The present invention relates to a method and apparatus for measuring the output of a sensor such as an optical sensor which receives a physical quantity such as light to be measured and outputs a measurement signal having a time width or time duration as a function of the size of the physical quantity, and more particularly to a method and apparatus suitable for measuring the intensity of lights received by an array of optical sensors incorporated in an autofocus camera.

2. Description of the Prior Art

Light, sound or the like, which is a physical quantity to be measured, has a very wide dynamic range, for example, of approximately $1:10^6$ and therefore a sensor for sensing these types of physical quantity should preferably have a measurement range that can discriminate the size of the physical quantity over the entire dynamic range thereof.

However, using the amplitude of an electrical signal from the sensor to represent the size of the physical quantity only permits discriminating the physical quantity within a dynamic range of $1:10^3$ at the best; therefore, it is common that the electrical signal is converted into another electrical signal wherein the time width or time duration of the signal varies as a function of the size of the physical quantity, and this converted signal is then output from the sensor. For an optical sensor, it is advantageous to employ a so-called charge storage type for converting the intensity of a light to be measured into the time width. A circuit example of such an optical sensor is shown in FIG. 5, and operational waveforms at various points in the sensor in FIG. 6.

FIG. 5 shows an optical sensor 1, which receives a light or a physical quantity L through a photodiode 1a. Photodiode 1a is, for example, of an optoelectric conductive type. When initializing the measurement of the light intensity, a transistor 1b in series with photodiode 1a is caused to be "ON" by a reset pulse RP shown in FIG. 6(a), applying a voltage V shown in FIG. 5 in a reverse polarity across photodiode 1a to charge the junction capacitance of photodiode 1a to voltage V. At this time, a voltage v at the connecting node between photodiode 1a and transistor 1b is equal to a ground potential E as shown in FIG. 6(b).

When photodiode 1a generates a photocurrent proportional to the size of physical quantity L, a capacitor C shown in FIG. 5 is caused to discharge by this photocurrent, and correspondingly, voltage v rises linearly with a time t, as shown in FIG. 6(b).

An inverter 1c is applied with voltage v, and an output S thereof rises to a logic level "1" at the same time as reset pulse RP rises to the same logic level, as shown in FIG. 6(c). Output S falls to a logic level "0", when voltage v reaches a threshold value Vth of inverter 1c. This output S is the measurement signal from sensor 1 and we have a functional relationship $\tau \alpha \ 1/\lambda$, where $\tau$ is the time width or time duration of measurement signal S and $\lambda$ is the size or intensity of physical quantity L to be measured.

By employing sensor 1 of, for example, a charge storage type and converting the size of physical quantity L to be measured into time width $\tau$, measurement signal S can be obtained in terms of time width $\tau$ exactly indicative of size $\lambda$ of physical quantity L to be measured, even when the physical quantity to be measured has a very wide dynamic range.

Expressing time width $\tau$ directly in a numerical value can cause the value to vary over a dynamic range as wide as $1:10^6$ if physical quantity L to be measured has a dynamic range of $1:10^6$ as stated above. Thus the numerical value of measurement output S may conveniently be converted into a logarithmic value, for subsequent manipulation thereof. For example, if the physical quantity to be measured is a light, it is expressed in a logarithmic so-called EV value, which is commonly used as a means for indicating the light intensity.

As shown in FIGS. 7 and 8, in Japanese Preliminary Patent Publication No. 62-204184, Applicant of the present invention has proposed a method for converting time width $\tau$, which is indicated by measurement signal S into a digital value which indicates time width $\tau$ in a logarithmic value.

FIG. 7 shows a schematic block diagram of a circuit incorporating such a method. A clock pulse generating circuit 2 generates clock pulses EVC, which time period gradationally increases at a common ratio. An AND gate 3 is provided for clock pulses EVC as well as measurement signal S from the sensor 1, with time width $\tau$ as shown in FIG. 8(a), from the sensor 1. The output of AND gate 3 provides count pulses CT shown in FIG. 8(c) to a counter 4. A digital value DT, which is the count value output of counter 4, represents in a logarithmic relationship the size of physical quantity L to be measured. Such physical quantity, for example, can be a light received by sensor 1, from which the aforementioned EV value can easily be known, for example. Even when a large number of digital values are involved, relating to a sensor array with a large number of optical sensors therein, for example, a small number of digits can still indicate accurately the pattern or contrast of the image received by the optical sensor.

However, the variable time period clock pulses of the prior art, used in the above-mentioned method, require that the ratio between the period of adjacent pulses is selected not to be an integer but a non-integer value very close to 1 to accurately represent the size of the physical quantity to be measured in a digital value. For this reason, clock pulse generating circuit 2 shown in FIG. 7 must be formed by combining a divider with a switching means for providing an input to the divider and an output therefrom. This creates a problem in that the circuit arrangement becomes complicated.

Moreover, although the digital value, as a measurement obtained by means of the clock pulse, is useful in many applications because it is in a logarithmic relationship with the size of the physical quantity to be measured, there are some situations in that a functional relationship other than logarithmic relationship is preferred. In these situations clock pulses having a time period varying at a non-common ratio must be generated to accommodate the functional relationship, further causing the circuit arrangement of the clock pulse generating circuit extremely complicated.

SUMMARY OF THE INVENTION

The present invention overcomes the problem and disadvantage of the prior art.

The object of the invention is to provide a method and apparatus for measuring the sensor output with a high degree of freedom in selecting a functional relationship between the measurement value of the sensor and the size of the physical quantity to be measured, and the method and apparatus requiring a simple overall circuit arrangement.

Additional objects and advantages of the invention will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a method, together with apparatus, which measures the size or intensity of a physical quantity to be measured using a sensor which receives the physical quantity to be measured and outputs a measurement signal having a time width or time duration as a function of the size of the physical quantity to be measured and comprises the steps of:

storing a plurality of setting values at a respective one of a plurality of addresses in a memory;

outputting one of the plurality of stored setting values when the respective address is specified;

generating clock pulses having a predetermined time period;

counting the clock pulses occurring during the duration of each measurement signal;

detecting a comparison between one of the plurality of setting values being output from the memory and the count value of the generated clock pulses;

changing the specified address of the memory in response to each detected comparison between one of the plurality of setting values and the count value of the generated clock pulses; and registering the specified address of the memory as a value representing the size of the physical quantity at the expiration of a time duration of each time measurement signal.

When applying the method of the present invention to a sensor array in which a plurality of sensors are disposed, it is advantageous to further provide a means for detecting the shortest time width or time duration of the measurement signals from the sensors in the sensor array, and a means for generating clock pulses having a time period which is obtained by dividing the shortest time width into a plurality of equal time segments and then counting these clock pulses during the time duration of each measurement signal for concurrently measuring the size of the physical quantities which are individually received by each sensor in the sensor array.

The basic arrangement and operation of the present invention will now be described with reference to FIG. 1 through FIG. 3.

FIG. 1 shows a schematic block diagram of a basic circuit example according to the present invention. FIG. 2 shows operating waveforms at various points in the circuit shown in FIG. 1. FIG. 3 shows a time width $\tau$ of the measurement signal from the sensor as a function of a size $\lambda$ of the physical quantity to be measured.

A sensor 1 in FIG. 1 receives, as shown in FIG. 5 previously, a physical quantity L to be measured, and then outputs a measurement signal S having time width $\tau$ which is a function of size or intensity $\lambda$ of physical quantity L. A memory means 20 may be a ROM, for example, or any device that can output data D at an address A specified by an address specifying means 30. Data D represents the above-mentioned setting values which have been prestored in memory means 20. Prestoring refers to storing a value in memory means 20 before the measurement from the sensor is taken.

The procedure by which the settings in memory means 20 are selected will be described in reference to FIG. 3, which shows an example of the procedure. Assuming that $\tau$ is inversely proportional to $\lambda$, time width $\tau$ of measurement signal S is a hyperbolic function of size $\lambda$ of physical quantity L to be measured, and a desired measurement range R of size $\lambda$ of the physical quantity to be measured is determined. As shown in FIG. 3, $\tau_o$ is defined as the shortest or smallest value of time width $\tau$ and $\tau_m$ as the longest or largest value of time width $\tau$. $\lambda_o$ and $\lambda_m$ are the value of size $\lambda$ of the physical quantity corresponding to $\tau_o$ and $\tau_m$ and respectively. Then, measurement range R from $\lambda_o$ to $\lambda_m$, is divided into a plurality of segments, for example, m segments to assign a setting value $\tau_i$ of time width $\tau$ corresponding to an estimated value $\lambda_i$ (i=0 to m) of the size of the physical quantity to be measured. Measurement range R may be divided into segments of an equal width with respect to size value $\lambda$ of the physical quantity to be measured.

Setting value $\tau_i$, which is a function of size value $\lambda_i$ of the physical quantity to be measured thus selected, is stored as a setting value into memory means 20. In other words, according to the present invention, estimated size value $\lambda_i$ (i=0 to m) of the physical quantity to be measured is stored in memory means 20 as m+1 setting values in the form of time setting values $\tau_i$ (i=0 to m), which is a function of $\lambda_i$.

Address specifying means 30 in FIG. 1 may be a counter in a simplest form, and outputs the count value as an address A to memory means 20 through a bus 31. A count means 40 is also a counter, which counts clock pulses CP having a predetermined sufficiently short period as shown in FIG. 2(b). Clock pulses CP are output from a clock pulse generating circuit 60, shown on the left side of count means 40 in FIG. 1.

A comparing means 50 detects a comparison between the count value from count means 40 with data D, which is the setting value output from memory means 20, and subsequently sends a switch command SW shown in FIG. 2(c) to address specifying means 30 for causing address specifying means 30 to output a different address when both count value and data D are coincident. If address specifying means 30 is a counter, then switch command SW serves as count pulses.

With m+1 time setting values $\tau_o$ to $\tau_m$ being prestored in memory means 20 as shown in FIG. 3, assume that sensor 1 starts to measure size $\lambda$ of physical quantity L to be measured. Then, measurement signal S of sensor 1 becomes a level "1" as shown in FIG. 2(a) when initiating the measurement. At the same time address A of address specifying means 30 is reset to an initial value AO, for example, a zero (0) value as shown in FIG. 2(d). Memory means 20 output is setting value $\tau_o$, corresponding to address AO, and the count value of count means 40 is set to 0.

When the count value of count means 40 reaches time setting value $\tau_o$, which is output from memory means 20, comparing means 50 sends a switch command SW to address specifying means 30 to switch address A0, for example, to A1. Likewise, address A is switched to Ai after time $\tau_{i-1}$ has elasped as shown in FIG. 2(d).

According to the present invention, when measurement signal S falls to "0" at the end of time width $\tau$ as shown in FIG. 2(a), the address Ai of address specifying means 30 is used as a measurement value indicative of the size of the physical quantity to be measured. For storing this measurement value, the address Ai may be loaded, for example, into a register 70 which is connected to address specifying means 30 via bus 31 in synchronism with the trailing edge of measurement signal S.

As it may be apparent from this, in the present invention, when the sensor sends out measurement signal S having time width $\tau$, size $\lambda$ of the physical quantity to be measured which is received from the sensor is represented by address Ai of memory means 20 in which time setting value $\tau_i$ close to time width $\tau$ is stored. Consequently, it can be known from address Ai that size value $\lambda_i$ corresponding to time setting value $\tau_i$ represents physical quantity L to be measured.

Memory means 20, address specifying means 30, count means 40, and comparing means 50, which form the method and apparatus according to the present invention, can be of a simple arrangement and the clock pulse that is supplied to count means 40 can be of a fixed period, therefore the overall arrangement can be simplified, compared to the prior art. Further, regardless of what functional relationship exists between size $\lambda$ of the physical quantity to be measured received by the sensor and time width $\tau$ of the measurement signal that is output from the sensor, the functional relationship between $\lambda$ and $\tau$ can be chosen independently while allowing that time setting value $\tau_i$ prestored in memory means 20 are in accordance with the functional relationship between size $\lambda$ and time width $\tau$. Precision of the measurement according to the present invention may be increased as required by increasing the number of segments which are set within the measurement range.

The accompanying drawings, which are incorporated in and constitute a part of this specification, illustrate one embodiment of the invention and together with the description serve to explain the principles of the invention.

BRIEF DESCRIPTION OF THE DRAWINGS

FIG. 1 is a schematic block diagram of a basic circuit for illustrating a basic arrangement of a method and apparatus for measuring the sensor output according to the present invention;

FIG. 2(a-d) show a waveform of signals at designated points (a) through (d) in the circuit as shown in FIG. 1 for illustrating the operation of the present invention;

FIG. 3 shows a functional relationship between the estimated value for the size of the physical quantity and the corresponding time setting value for illustrating a procedure of determining the setting values in the memory means, according to the present invention.

FIG. 5 is a schematic diagram of a sensor used in an embodiment of the present invention;

FIG. 6 (a-c) show a waveform of signals at designated points (a) through (c) of the sensor as shown in FIG. 5, for illustrating the operation of the sensor;

FIG. 7 is a schematic block diagram of a circuit of the prior art for illustrating a general arrangement of the circuit of the prior art for measuring the sensor output.

FIG. 8(a-c) show a waveform of signals at designated points (a) through (c) of the circuit as shown in FIG. 7 for illustrating the operation of the prior art.

DESCRIPTION OF THE PREFERRED EMBODIMENT

Figure 4:
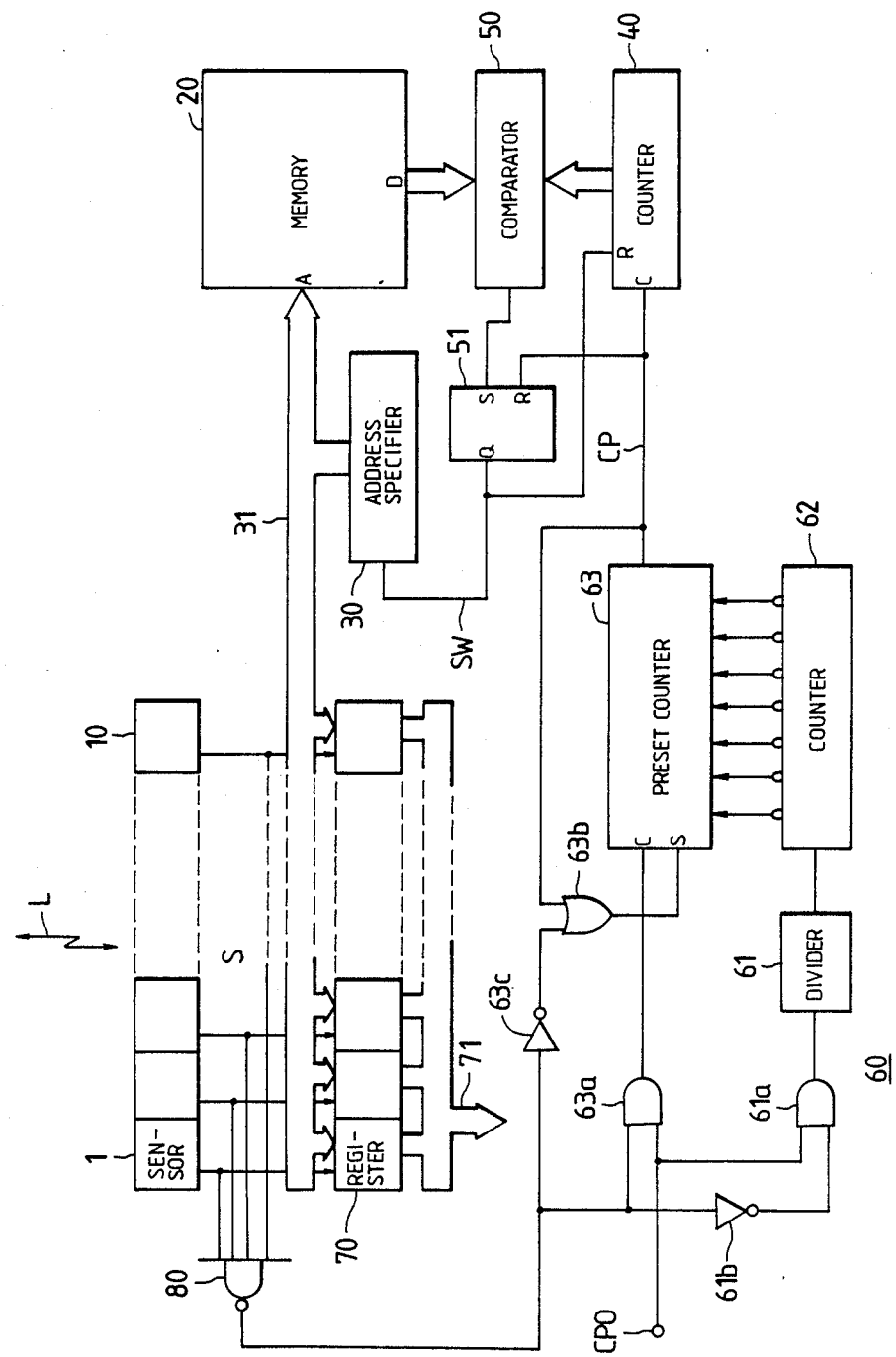
FIG. 4 is a schematic block diagram of a circuit which is an embodiment of the present invention as applied to a sensor array.

Reference will now be made in detail to the present preferred embodiment of the invention, an example of which is illustrated in the accompanying drawings. Wherever possible, the same reference numbers will be used throughout the drawings to refer to the same or like parts.

As shown in FIG. 4, the embodiment relates to an optical sensor array for an autofocus device of a camera. n optical sensors 1, for example, 32 to 64 sensors are disposed in an optical sensor array 10 as shown in FIG. 4. The image of a subject is formed by means of a lens or the like (which is not shown) on the sensors. An array of lights of differing intensities, as a physical quantity L to be measured in accordance with the intensity of the image, are incident on sensors 1.

Sensors 1 are provided with registers 70 thereunder as shown in FIG. 4. Registers 70 receive measurement signals S from sensors 1. A memory means 20, an address specifying means 30, a count means 40 and a comparing means 50 which form the measurement method according to the present invention are provided to handle signals from n sensors 1 incorporated in sensor array 10. A pair of sensor arrays 10 are commonly provided for autofocusing, and these sensor arrays may be arranged to share aforementioned means 20, 30, 40 and 50. Address specifying means 30 in the embodiment is, for example, a 7-bit counter which outputs and sends an address A via a 7-bit bus 31 to n registers 70 which are provided for the ROM of memory means 20 and for each one of the above-described respective sensors. Each one of registers 70 is of a 7-bit arrangement in accordance with bus 31 so that the stored setting value thereof can be read out via another bus 71 of the same 7-bit arrangement.

Measurement range R shown in FIG. 3 is divided into m(=128) segments in this embodiment in accordance with 7-bit address A. Therefore time setting values, $\tau_o$ to $\tau_m$ as a function of size values or light intensity values $\lambda_o$ to $\lambda_m$ of the physical quantity and also as a function of m+1(=129) segments of the physical quantity to be measured, may be stored at addresses Ai(i=o to m) in the ROM of memory means 20.

A difference $\Delta\tau$ between adjacent time setting values $\tau_{i-1}$ and $\tau_i$ shown in FIG. 3 is stored as a setting value in memory means 20 in this embodiment so that the storage capacity of memory means 20 can be minimized. Measurement range R is determined such that the ratio $\lambda_o/\lambda_m$ of light intensity $\lambda$ to be meassured, is 16, for example. Thus if intensity $\lambda$ is inversely proportional to time width $\tau$, then the ratio $\tau_o/\tau_m$ is 1/16. Measurement range R is divided, in a simplest form, into equal segments with respect to $\lambda$.

However, the average intensity of an image incident upon sensor array 10 may vary largely in response to the brightness of the field of view. Thus the time width of measurement signal S from the sensor which receives a light having the highest intensity value $\lambda_o$ among an array of sensors 10, or the shortest time setting value $\tau_o$ is detected to determine the time period of a clock pulse CP, which is to be supplied to count means 40. Measurement range R is set with the highest intensity value $\lambda_o$ of the light received by the sensor which outputs measurement signal S having the shortest time setting value $\tau_o$ being set as an upper limit every time the measurement is made.

A shortest time detection means 80 comprising, for example, a NAND gate, is provided for this purpose. Since the NAND gate receives measurement signals S from all sensors 1 in sensor array 10, the output thereof is "0" when all measurement signals S from respective sensors 1 are "1" shortly after the initiating of measurement signal S from one or more of sensors 1 changes to "0", the output of the NAND gate becomes "1". The time required for the signal from shortest time detection means 80 to change from "0" to "1", is thus the shortest time width or duration that measurement signals S from the sensor of the sensor array has.

A clock generating means 60 shown at the lower portion of FIG. 4 is to divide a basic clock pulse CPO with a dividing ratio, effected by the signal from shortest time detecting means 80, and then to output as a clock pulse CP to count means 40. Clock generating means 60 consists of a counter 62 for receiving basic clock pulse CPO through an AND gate 61a and a divider 61, and a preset counter 63 for receiving basic clock pulse CPO through an AND gate 63a.

When the signal from shortest time detecting means 80 is "0", an AND gate 61a is enabled through an inverter 61b so that basic clock pulse CPO is divided by divider 61 to be supplied to counter 62. Divider 61 is, for exmaple, a 7-bit counter, the dividing ratio of which is 1/128. The complement of the count value of counter 62 is loaded as a preset value into preset counter 63, since set command input s of preset counter 63 is supplied with "1" through an inverter 63c and an OR gate 63b, when the output signal of shortest time detecting means 80 is "0".

When the signal from shortest time detecting means 80 is "1", an AND gate 63a is enabled to supply basic clock pulse CPO to preset counter 63 while at th same time AND gate 61a is closed, thereby counter 62 will hold the count value at that time. Preset counter 63 is preset with the complement of this count value of counter 62, thus a carry signal from the final stage thereof is clock pulse CP, which is obtained from basic clock pulse CPO divided by the count value of counter 62, and is supplied to count means 40. In addition, preset counter 63 is preset to the complement of the count value of counter 62 through OR gate 63b for every carry signal, thereafter the same operation being repeated.

Assuming that the dividing ratio of divider 61 is 1/N1, the count value of counter 62 is N2, and the period of basic clock pulse CP is $\Delta T$, shortest time $\tau_o$ for the count value of counter 62 to become N2 is given by $\tau_o = N1 \cdot N2 \cdot \Delta T$. Since the period of clock pulse CP is $N2 \cdot \Delta T$, the period of clock pulse CP is 1/N1 of shortest time $\tau_o$, or 1/128 of $\tau_o$ in this example.

As is apparent from the above description of the embodiment, even if the average light intensity of the image incident upon sensor array 10 varies, measurement range R which can cover the required dynamic range may be automatically selected, with the highest light intensity value $\lambda_o$ of the light incident upon the sensors of the sensor array being an upper limit. Further, the time setting values to be stored in memory means 20 or the difference between adjacent time setting values need not be altered at all regardless of how measurement range R is selected. The period of the clock pulse, which is a tool for measuring these time setting values, varies only in accordance with the shortest time setting value, and thus the same setting values can be used directly as they are.

It is naturally preferred to measure time width or time duration $\tau$ of measurement signal S with as high precision as possible. The shorter the time period of the clock pulse, the higher the precision. But for a practically satisfactory result, the number by which the shortest time setting value $\tau_o$ is divided is selected to be equal to or greater than the number by which measurement range R is divided. In this embodiment, the number by which the shortest time setting value $\tau_o$ is divided by the period of clock pulse CP is determined by the dividing ratio of divider 61 of clock pulse generating circuit 60 as mentioned previously. This dividing ratio is 1/128, in this embodiment, and the shortest time setting value $\tau_o$ is divided by clock pulse CP into 128 segments, the same number by which measurement range R is divided.

When initiating the measurement of the light intensity distribution of an image incident upon sensor array 10, all the counters, including address specifying means 30 which is a counter, are cleared to zero. After the shortest time setting value $\tau_o$, the trailing edge of the time width of measurement signal S from sensor 1, which receives the light of the highest intensity, is detected by shortest time detecting means 80. In accordance with the shortest time setting value $\tau_o$, the period of clock pulse CP is established and is supplied to count means 40 from clock pulse generating means 60 as described previously.

When the count value of count means 40 agrees with the setting value from memory means 20 as mentioned previously, comparing means 50 causes address specifying means 30 to change address A by means of switch command SW. Because the difference of the adjacent time setting values within measurement range R, $\Delta \tau = \tau_i - \tau_{i-1}$, is set in memory means 20 of the embodiment, the count value of count means 40 is cleared by switch command SW every time address specifying means 30 is caused to change address A. A flip-flop 51 in FIG. 4 is for shaping the waveform of switch command SW, and is set by a signal from comparing means 50 to output switch command SW when count means 40 has counted clock pulses CP to a value equal to the setting value from memory means 20. Then the next clock pulse CP resets flip-flop 51. Consequently, switch command SW is a pulse signal having a time width nearly equal to one period of clock pulse CP and serves as a count pulse for the counter as address specifying means 30 and also serves as a clear command for count means 40.

Thereafter, when the time width of measurement signal S, which is output from respective sensors 1 in sensor array 10, reaches the trailing edge thereof, register 70 corresponding to that sensor reads and stores the value of address A at that time. When the time width of measurement signals S, which are output from all of respective sensors 1 in sensor array 10, reach trailing edges thereof, the measurement is completed and then the values stored in respective registers 70 can be read out through bus 71.

In the case where some of measurement signals S are of very long time width and the measurement has not been completed after time $\tau_m$, which is a limit of measurement range R, all the sensors may be reset, for example, to abort the measurement at time $\tau_m$ and then register 70 corresponding to the sensor which has not completed the measurement may be loaded the ultimate address value at time $\tau_m$.

In this embodiment, register 70 corresponding to the sensor which outputs measurement signal S having the shortest time setting value $\tau_o$ holds the first address value, "0". Also in the embodiment, address specifying means 30 is a 7-bit counter to divide measurement range R into 128 segments; therefore, the respective registers hold a 7-bit measurement data which represents intensity $\lambda$ of the light recieved by the corresponding sensor with 0 to 127 different values. Dividing the light intensity distribution in this level of precision should be sufficient for good measurement result, even when the sensor array is meant for an autofocus camera with significantly precise focusing. Additionally, the aforementioned embodiment is only exemplary and various modification and variations can be made without departing from the scope or spirit of the invention.

According to the present invention, it is only required that the time width of the measurement signal is stored as setting values in a memory having a functional relationship with the size of the physical quantity to be measured. Therefore, the method for measuring the sensor output can have a very high degree of freedom with respect to the requirements to the setting values. The apparatus for utilizing a method according to the present invention can be constructed with conventional parts. Moreover, a large number of parts are not needed, and thus the apparatus according to the present invention can be constructed in a simple arrangement as compared to the prior art method.

Further, a method according to the present invention has a high degree of freedom in setting the level of precision required for measurement. The method can be adapted to meet a new precision requirement without significantly changing the basic arrangement. For applying a method according to the present invention to a sensor array with a plurality of sensors, the features of the present invention can be utilized by adding a few additional simple parts to the basic arrangement of the single sensor system. The effect of the invention is particularly useful in measuring the light intensity distribution of the image of a subject in an autofocus camera, and thus the present invention is highly expected to make a substantial contribution to improving performance of autofocusing in the cameras.

What is claimed is:

1. A method of measuring the output of a sensor for determining the size of a physical quantity to be measured, wherein the sensor receives the physical quantity and outputs a measurement signal having a time duration, said time duration corresponding to the size of said physical quantity, comprising the steps of:
    storing a plurality of setting values at a plurality of respective addresses in a memory;
    outputting one of the plurality of stored setting values when the respective address is specified;
    generating clock pulses having a predetermined time period;
    counting the clock pulses occurring during said time duration of said measurement signal;
    detecting a comparison between one of the plurality of setting values being output from the memory and the count value of the generated clock pulses;
    changing the specified address of the memory in response to each detected comparison between one of the plurality of setting values and the count value of the generated clock pulses; and
    registering the specified address of the memory as a value representing the size of the physical quantity at the expiration of a time duration at each time measurement signal,
    wherein the sensor includes an array of individual sensors, each sensor receiving a respective one of an array of incident lights having a plurality of intensities, the step of detecting includes detecting the comparison between the setting value output from the memory and the count value corresponding to light intensity for each individual sensor of the sensor array and the step of registering includes registering in succession the specified address of the memory corresponding to each individual sensor of the sensor array upon the expiration of each respective time duration corresponding the respective measurement signal.

2. A method of measuring the output of a sensor according to claim 1, wherein the stored setting values correspond to estimated sizes of the physical quantity during time segments of said measurement signal.

3. A method of measuring the output of a sensor according to claim 1, wherein each one of the stored setting values corresponds to a value corresponding to the difference of adjacent values at spaced time intervals during the time duration of the measurement signal.

4. A method of measuring the output of a sensor according to claim 1, wherein the step of counting includes setting the count to a zero when the specified address is changed.

5. A method of measuring the output of a sensor according to claim 1, wherein the time period of the generated clock pulses is less than the shortest time duration of the measurement signals output from the array of sensors.

6. A method of measuring the output of a sensor according to claim 1, wherein the time period of the generated clock pulses is obtained by dividing the shortest time duration of the measurement signals output from the array of sensors into a plurality of time segments.

7. A method of measuring the output of a sensor according to claim 1, further comprising the step of setting a limit on the measurement range over which the size of the physical quantity received by the array of sensors is to be measured corresponding to the shortest time duration of the measurement signals output from the array of sensors.

8. A method of measuring the output of a sensor for determining the size of a physical quantity to be measured, according to claim 6, wherein the number of said plurality of time segments is greater than the number of the plurality of setting values in the memory.

9. Apparatus for measuring the output of a sensor for determining the size of a physical quantity to be measured, wherein the sensor receives the physical quantity and outputs a measurement signal having a time duration as a function of the size said physical quantity, comprising:
    a memory means for storing a plurality of setting values at a respective one of a plurality of addresses thereof;
    an address specifying means for causing the memory means to output one of the plurality of stored value settings when the respective address is specified;
    a clock pulse generating means for generating clock pulses with a predetermined time period;
    a count means for counting the clock pulses occurring during the duration of said measurement signal;

a detecting means for detecting a comparison between one of the plurality of setting values output from the memory means and the count value of the generated clock pulses, and then for causing the address specifying means to change the specified address of the memory means in response to each detected comparison between one of the plurality of the value settings and the count value; and a register means connected to the sensor and said address specifying means for registering the specified address being output from said address specifying means as a value representing the size of the physical quantity at the expiration of a time duration of said time measurement signal, wherein the sensor includes an array of individual sensors, each sensor receiving a respective one of an array of incident lights having a plurality of intensities, the detecting means includes means for detecting the comparison between the setting value output from the memory and the count value corresponding to light intensity for each individual sensor of the sensor array, and the register means includes means for registering in succession the specified address of the memory corresponding to each individual sensor of the sensor array upon the expiration of each respective time duration corresponding to the respective measurement signal.

10. Apparatus for measuring the output of a sensor according to claim 9, wherein the register means includes an array of registers, each register being connected to a respective one of the individual sensors.

11. Apparatus for measuring the output of a sensor according to claim 10, wherein the clock pulse generator includes means for generating the clock pulses having a time period corresponding to the shortest time duration of the measurement signals output from the sensor array divided by a plurality of equal time segments.

* * * * *